United States Patent [19] [11] 4,130,402
Schepers et al. [45] Dec. 19, 1978

[54] METHOD FOR PRODUCING COARSELY CRYSTALLINE ALUMINA

[75] Inventors: Bernhard Schepers, Burnside, La.; Heinz Hellinghausen, Ludwigshafen am Rhein; Alois Kramer, Hassloch, both of Fed. Rep. of Germany

[73] Assignee: Guilini Chemie G.m.b.H., Ludwigshafen am Rhein, Fed. Rep. of Germany

[21] Appl. No.: 800,046

[22] Filed: May 24, 1977

[30] Foreign Application Priority Data

May 26, 1976 [DE] Fed. Rep. of Germany ....... 2623482

[51] Int. Cl.² ......................... C04B 31/02; C01F 7/02
[52] U.S. Cl. .................................. 51/309 A; 423/625
[58] Field of Search ........................... 423/625; 51/309

[56] References Cited

U.S. PATENT DOCUMENTS

| 2,360,841 | 10/1944 | Baumann et al. | 51/309 |
| 3,406,010 | 10/1968 | Holderreed et al. | 423/625 |
| 3,457,032 | 7/1969 | La Breteque | 423/625 |
| 3,832,442 | 8/1974 | Emerson | 423/625 |
| 4,019,914 | 4/1977 | Esper et al. | 423/625 |

FOREIGN PATENT DOCUMENTS 678220 1/1964 Canada ..................................... 423/625

Primary Examiner—Herbert T. Carter
Attorney, Agent, or Firm—Spencer & Kaye

[57] ABSTRACT

Coarsely crystalline aluminum oxide is provided which contains the following trace elements: $V_2O_5 > 0.005$ percent by weight, $P_2O_5 > 0.005$ percent by weight, $Na_2O > 0.8$ percent by weight.

A method is provided for producing such an aluminum oxide by calcining aluminum hydroxide in the presence of at least one flouride and of vanadium salt.

9 Claims, No Drawings

METHOD FOR PRODUCING COARSELY CRYSTALLINE ALUMINA

BACKGROUND OF THE INVENTION

The present invention relates to coarsely crystalline alumina, hereinafter also called technical grade aluminum oxide, as well as to a method for producing it.

Technical grade aluminum oxide is usually produced by heating (calcination) of an aluminum hydroxide, such as a hydrargillite, in a rotary drum furnace or fluidized bed furnace at temperatures around 1100° C. The thus-produced aluminum oxide with a red heat loss of 0.5 to 1% is composed of a mixture of transition oxides of the gamma $Al_2O_3$ series and of alpha $Al_2O_3$, and is characterized by a specific surface of 5 to 30 $m^2/g$. The average primary particle size, determined according to the Eppendorf method in which after grinding of the aluminum oxide the optical density of an aluminum oxide sample is measured in water in dependence on time by means of the Eppendorf photometer and the resulting grain distribution of the aluminum oxide is determined, is about 0.5 to $1\mu$.

If the calcination temperature is increased to more than 1200° C., aluminum oxide forms almost exclusively in alpha modification, the specific surface is reduced to values of $< 1$ $m^2/g$, and the average primary particle size grows to about $3\mu$.

It is also known that in the presence of about 0.001 to 0.5 percent by weight of a mineralizer in the starting aluminum hydroxide, e.g. in the presence of fluorides such as $AlF_3$, $CaF_2$ or $Na_3AlF_6$, aluminum oxides of the alpha modification are produced already at temperatures of about 1100° C. with a specific surface of 0.5 $m^2/g$ which is also small. The average primary crystal size of such aluminum oxides lies at about $6\mu$. Higher temperatures and/or greater quantities of the exemplary mineralizers mentioned above have only insignificant influence on the above-mentioned parameters such as alumina modification, specific surface and average primary crystal size.

However, for certain applications, such as for use during grinding and lapping operations, aluminum oxides are required which have average primary crystal sizes of more than $6\mu$.

The well-known Bayer process for producing aluminum oxide (alumina) is universally operated on a continuous basis and involves pressure digestion of aluminous ores, such as bauxites and laterites, in caustic aluminate liquor of varying caustic soda concentration and at elevated temperatures depending upon the type of ore to extract the available alumina. The caustic liquor enriched in sodium aluminate is then subjected to clarification by settling, washing, and filtering to remove the so-called red mud residue of the ore which consists primarily of hydrated ferric oxide and a desilication product. Aluminum hydroxide (alumina hydrate) is then auto-precipitated from the clarified green liquor by decomposition of sodium aluminate through seeding with previously-precipitated alumina hydrate. The precipitated aluminum hydroxide is then separated as by filtration from the liquor and is then washed and calcined to form the desired aluminum oxide. The spent caustic liquor is recycled to the digestion phase, usually after concentration as by evaporation and addition of required amounts of make-up caustic liquor. The sodium aluminate liquor which has been concentrated as by evaporation contains a number of contaminants in the form of salts which must be removed from the liquor from time to time. For this purpose, part of the concentrated liquor can be cooled to precipitate the salts which can then be separated from the liquor in a centrifuge. A mixture of salts is obtained, which mixture is often referred to as foreign salts. The most valuable component of these foreign salts is vanadium and, as a result, the mixture of foreign salts is also known as "vanadium salt".

SUMMARY OF THE INVENTION

It is an object of the present invention to produce aluminum oxides which have a primary crystal size of more than $6\mu$.

Another object of the present invention is to provide a method for providing such aluminum oxides.

Additional objects and advantages of the present invention will be set forth in part in the description which follows and in part will be obvious from the description or can be learned by practice of the invention. The objects and advantages are achieved by means of the processes, products and combinations particularly pointed out in the appended claims.

It has surprisingly been found that aluminum oxides with an average primary crystal size of 6.1 to $25\mu$, particularly 8 to $16\mu$, can be produced by effecting the calcination of the aluminum hydroxide in the presence of at least one fluoride and vanadium salt.

Vanadium salt is here understood to mean the foreign salts which were discussed above and which are precipitated from concentrated sodium aluminate liquor at many alumina plants, which salts contain, in addition to much sodium carbonate, fluctuating quantities of vanadium, phosphorus, fluorine and arsenic compounds. The foreign salts are known to accumulate in circulating sodium aluminate liquors of the Bayer process and are separated from the sodium aluminate liquors by the addition of CaO, either together with the red mud or by means of a special crystallization process, until the liquor drops below the saturation limit.

The composition of the so-called vanadium salt fluctuates considerably. In dependence on the process sequence and on the origin of the bauxite, such vanadium salt may contain, for example, 1.8, 0.5 or 3.6 percent by weight $As_2O_3$, 5.2, 2 or 10 percent by weight $V_2O_5$, 12, 6 or 20 percent by weight $P_2O_5$, 1.9, 1 or 3.5 percent by weight F, and 3.53, 10 or 15 percent by weight $CO_2$ in addition to 45.7 percent water of crystallization. A result of the above-mentioned fluctuations is that the quantities of the vanadium salt employed in the method of the present invention can be given only if the composition of the vanadium salt is known.

The calcination of the present invention preferably is effected at temperatures of 1100° to 1300° C.

The coarsely crystalline aluminum oxide of the present invention contains the following trace elements: $V_2O_5 > 0.005$ percent by weight, $P_2O_5 > 0.005$ percent by weight, and $Na_2O > 0.8$ percent by weight. Preferably, the coarsely crystalline aluminum oxide of the present invention contains $V_2O_5$ in an amount of 0.005 to 0.05 percent by weight, $P_2O_5$ in an amount of 0.005 to 0.05 percent by weight, and $Na_2O$ in an amount of 0.8 to 3 percent by weight. These amounts of trace elements which are present in the coarsely crystalline aluminum hydroxide of the present invention are higher than the amounts of these trace elements which are normally present in conventionally-produced aluminum oxide. The higher amounts of these trace elements in the present invention arise from the addition of vanadium salt to the aluminum hydroxide that is to be calcined.

It is to be understood that both the foregoing general description and the following detailed description are exemplary, but are not restrictive of the invention.

DESCRIPTION OF THE PREFERRED EMBODIMENTS

The aluminum hydroxide which customarily is used for the calcination to produce aluminum oxide has an $Al_2O_3$ content of 65 percent by weight and contains the following quantities of trace elements by weight:

$V_2O_5 < 0.005\%$, e.g. 0.0003%
$P_2O_5 < 0.005\%$, e.g. 0.0004%
$F < 0.01\%$, e.g. 0.004–0.008%
$Na_2O < 0.6\%$, e.g. 0.3–0.5%

In the practice of the present invention, at least one fluoride compound is added as a mineralizer to the starting aluminum hydroxide. The fluoride compound which is added as a mineralizer can be a fluoride such as $AlF_3$, $CaF_2$, or $Na_3AlF_6$, or mixtures thereof, and generally is added in an amount 0.001 to 0.1 percent by weight with respect to the $Al_2O_3$ content of the starting aluminum hydroxide.

In the practice of the present invention, and without considering the added 0.001 to 0.1 percent by weight of mineralizing fluorides with respect to $Al_2O_3$, the starting aluminum hydroxide according to the present invention has added to it so much of the vanadium-salt-containing foreign salt that the starting aluminum hydroxide (alumina hydrate) contains the following quantities of trace elements by weight:

$V_2O_5 > 0.005\%$, e.g. 0.005–0.03%
$P_2O_5 > 0.005\%$, e.g. 0.005–0.03%
$F > 0.01\%$, e.g. 0.01–0.03%
$Na_2O > 0.6\%$, e.g. 0.8–3%

If an aluminum hydroxide of this composition is fed into a rotary drum furnace in the presence of the added fluoride compounds required according to the invention which act as mineralizer, and particularly in the presence of 0.001 to 0.1 percent by weight of such fluoride compounds with respect to the $Al_2O_3$, the resulting growth in the average primary particle size during calcination at temperatures above 1100° C. and with the otherwise customary furnace settings in dependence on time is such that the resulting average primary particle size of the aluminum oxide is greater than $7\mu$. Average primary particle sizes of greater than $10\mu$, $12\mu$, or $16\mu$ can be achieved by the practice of the present invention, and at most the average primary particle size can be about $25\mu$. The chemical composition of the resulting aluminum oxides indicates the following weight contents:

$V_2O_5 > 0.005\%$, e.g. 0.005 to 0.05%;
$P_2P_5 > 0.005\%$, e.g. 0.005 to 0.05%; and
$Na_2O > 0.8\%$, e.g. 0.8 to 3%.

A radiographic examination of the aluminum oxide produced shows that there exists, in addition to alpha $Al_2O_3$, significant portions of beta $Al_2O_3$ (e.g. $Na_2O \cdot 11 Al_2O_3$).

Doping of the starting aluminum hydroxide (alumina hydrate) with vanadium salt can technically be accomplished in a simple manner by only partially washing during filtration the aluminum hydroxide crystallized out of the sodium aluminate liquor. Thus, it is possible to retain the salts required for the process of the present invention in the necessary order of magnitude in finest dispersion on the aluminum hydroxide surface. With such a filter-wet aluminum hydroxide, and with the addition of fluoride, particularly in quantities from 0.001 to 0.1 percent by weight with respect to the $Al_2O_3$, a coarsely crystalline aluminum oxide can be produced which has the necessary properties for its intended use.

The following examples are given by way of illustration to further explain the principles of the invention. These examples are merely illustrative and are not to be understood as limiting the scope and underlying principles of the invention in any way. All percentages referred to herein are by weight unless otherwise indicated.

EXAMPLE 1

An aluminum hydroxide doped with vanadium salt to contain 0.01% $V_2O_5$, 0.01% $P_2O_5$, 0.02% F and 1.2% $Na_2O$, and doped with an additional 0.02% $AlF_3$ with respect to the $Al_2O_3$, is charged into a rotary drum furnace which is operated for the manufacture of a known aluminum oxide. In the production of the known aluminum oxide, a mixture of gamma and alpha $Al_2O_3$ is produced with a specific surface of 5 to 30 m²/g and an average primary particle size of about $1\mu$. The calcination temperature is about 1200° C. By using the doped aluminum hydroxide in accordance with the present invention as the starting material which is charged into the rotary drum furnace, already after 6 hours at about 1200° C., heavy crystal growth occurs and, after 18 to 24 hours, an aluminum oxide is obtained which has an average primary crystal size of $12\mu$, as required for certain purposes in the grinding and polishing art.

EXAMPLE 2

A rotary drum furnace operated for the production of alpha alumina and having been charged, in order to produce more rapid conversion of $Al(OH)_3$ to alpha $Al_2O_3$, with aluminum fluoride as mineralizer in quantities of 0.05% with respect to the $Al_2O_3$ content of the $Al(OH)_3$, produces an alpha $Al_2O_3$ with a specific surface of $< 0.5$ m²/g and an average primary crystal size of about $5\mu$. The starting aluminum hydroxide which is charged to the furnace is then changed to an aluminum hydroxide which has a vanadium salt doping according to the invention, as described in Example 1, and with the 0.05% aluminum fluoride as mineralizer, the furnace produces, after about 10 to 12 hours with otherwise identical furnace condition, an aluminum oxide which has an average primary crystal size of about 10 to $16\mu$, as required for certain intended purposes. The temperature of the furnace was about 1200° C.

It will be understood that the above description of the present invention is susceptible to various modifications, changes and adaptations, and the same are intended to be comprehended within the meaning and range of equivalents of the appended claims.

What is claimed is:

1. Coarsely crystalline aluminum oxide having a portion in the beta $Al_2O_3$ modification, and having the following trace elements: $V_2O_5 > 0.005$ percent by weight, $P_2O_5 > 0.005$ percent by weight, and $Na_2O > 0.8$ percent by weight, and which has an average primary crystal size of more than $6\mu$.

2. Aluminum oxide as defined in claim 1 which contains $V_2O_5$ in an amount of 0.005 to 0.05 percent by weight, $P_2O_5$ in an amount of 0.005 to 0.05 percent by weight, and $Na_2O$ in an amount of 0.8 to 3 percent by weight.

3. Aluminum oxide as defined in claim 1 which has an average primary crystal size of between 6.1 and 25μ.

4. Aluminum oxide as defined in claim 1 which has an average primary crystal size between 8 and 16μ.

5. A method for producing a coarsely crystalline aluminum oxide having a portion in the beta $Al_2O_3$ modification, having an average primary crystal size of more than 6μ and having the following trace elements: $V_2O_5$ > 0.005 percent by weight, $P_2O_5$ > 0.005 percent by weight, $Na_2O$ > 0.8 percent by weight, comprising calcining aluminum hydroxide in the presence of vanadium salt and at least one fluoride compound, the amount of vanadium salt being sufficient to provide said weight percentages of $V_2O_5$, $P_2O_5$ and $Na_2O$.

6. Method as defined in claim 5 wherein the fluoride compound is used in an amount of 0.001 to 0.1 percent by weight with respect to the $Al_2O_3$ content of the aluminum hydroxide.

7. Method as defined in claim 5 wherein the calcination is effected at temperatures of 1100° to 1300° C.

8. Method as defined in claim 5 wherein the vanadium salt is present in an amount such that the aluminum oxide contains $V_2O_5$ in an amount of 0.005 to 0.05 percent by weight, $P_2O_5$ in an amount of 0.005 to 0.05 percent by weight and $Na_2O$ in an amount of 0.8 to 3 percent by weight.

9. Method as defined in claim 5 wherein the fluoride compound is $AlF_3$, $CaF_2$, $Na_3AlF_6$, or a mixture thereof.

* * * * *